May 13, 1958 L. R. GRAY 2,834,368
MULTIPLE VALVE ASSEMBLY
Filed Aug. 1, 1955 3 Sheets-Sheet 2
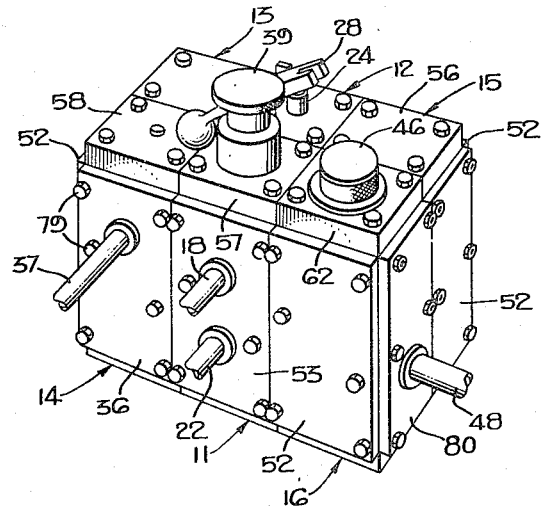
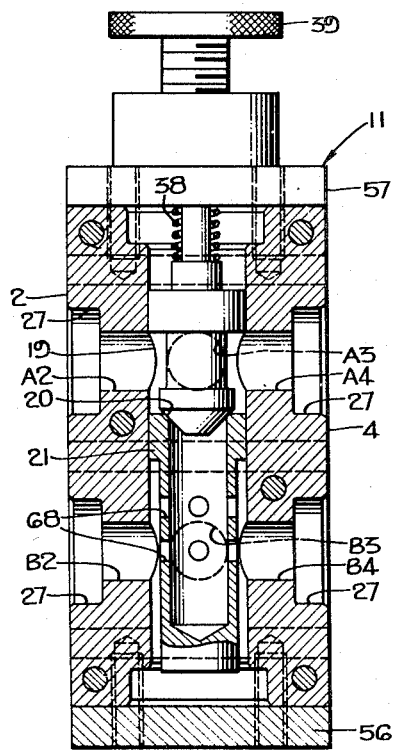
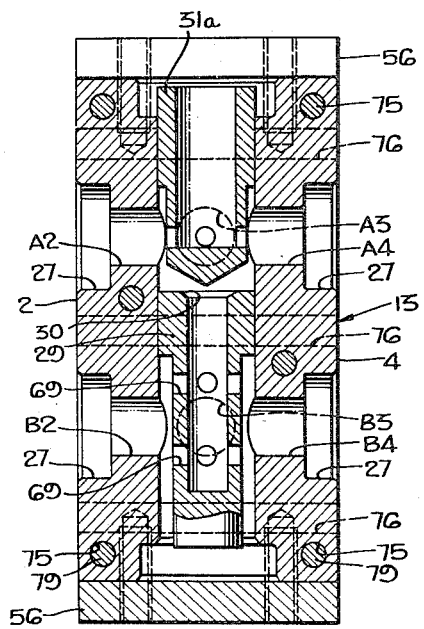
INVENTOR,
LANDON R. GRAY
BY
Mellin and Hanscom
ATTORNEYS

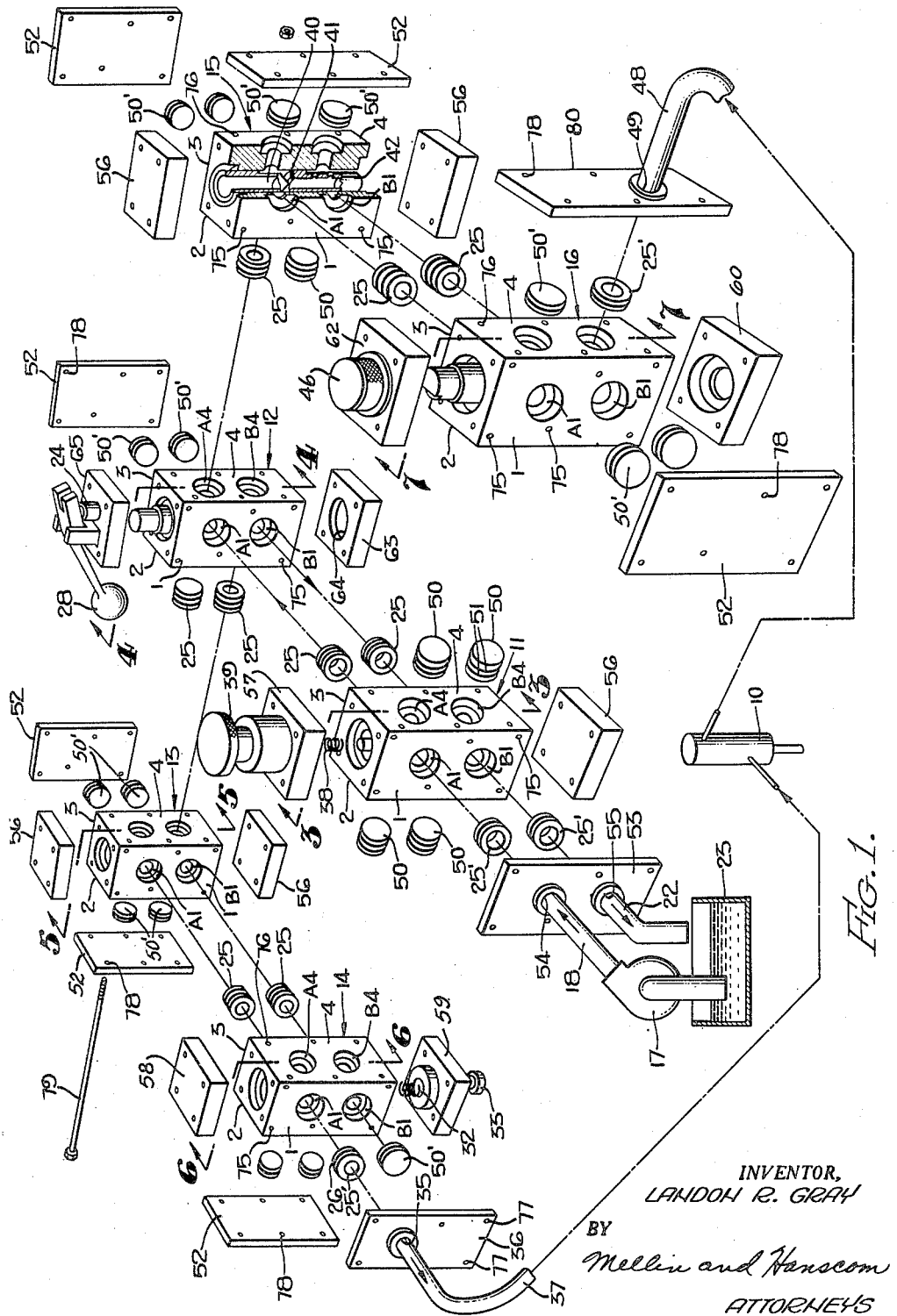

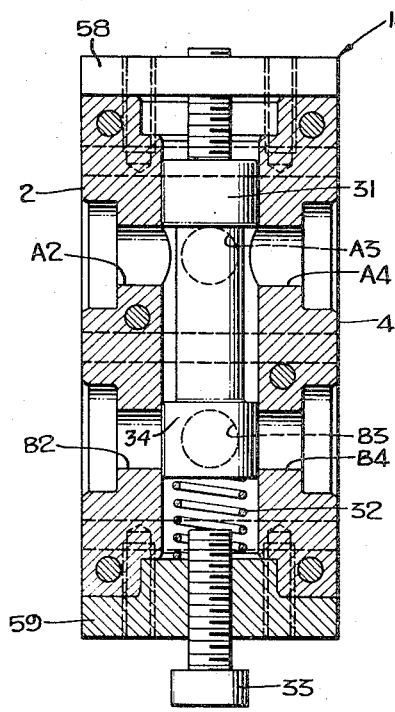
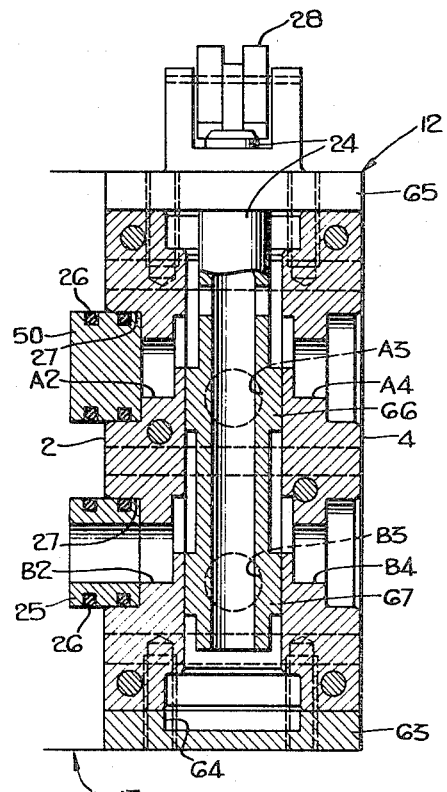
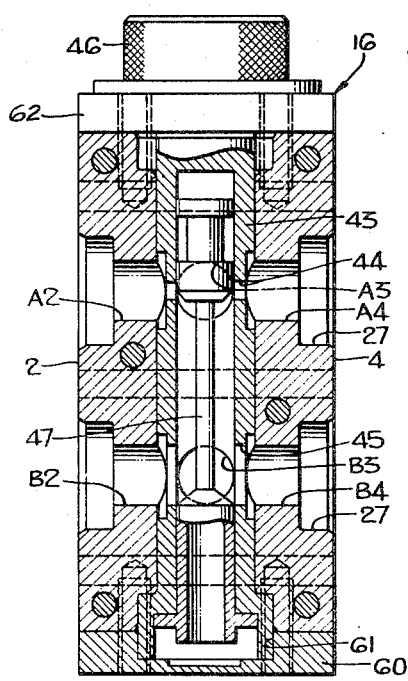

United States Patent Office 2,834,368
Patented May 13, 1958

2,834,368

MULTIPLE VALVE ASSEMBLY

Landon R. Gray, Torrance, Calif.

Application August 1, 1955, Serial No. 525,447

2 Claims. (Cl. 137—271)

This invention relates to hydraulic systems and particularly pertains to a valve mechanism for use in such systems.

Prior to my invention, hydraulic systems employing a multiple of valve functions were characterized by complicated piping which was expensive and time consuming to install and which made changes in the system extremely difficult. This was due mainly to the necessity of separately interposing the necessary valves in the pipe lines of the system, thus requiring multiple pipe lines to complete the hydraulic circuit.

It is the principal object of my invention to eliminate the necessity of separately interposing the valves in the pipe lines of a hydraulic system and thus eliminate the necessity of expensive and complicated piping in such a system.

I accomplish this object by providing a novel and improved form of valve fitting which in a single form is capable of receiving any of the various types of valves functionally necessary in a hydraulic circuit, which single form of valve fitting enables a selected number of fittings to be arranged in juxtaposition into a unitary assembly to embody all the selected valve functions of the system without requiring piping connections between the various valves and thus reducing the piping of the system to a minimum.

The invention is exemplified in the following description and is illustrated by way of example in the accompanying drawings in which:

Fig. 1 is an exploded view of a valve assembly embodying the principles of my invention.

Fig. 2 is a perspective view of the hydraulic system showing the valve assembly in its assembled relation.

Figs. 3, 4, 5, 6 and 7 are sectional views taken on lines 3—3, 4—4, 5—5, 6—6 and 7—7, respectively, of Fig. 1.

Referring now to the drawings wherein similar reference numerals are used to denote the same elements throughout the various views shown, the hydraulic system illustrated by way of example is of the type used to control the operation of a double acting cylinder 10 of a hydraulic press unit. The system comprises six valve fittings or bodies 11, 12, 13, 14, 15 and 16, respectively.

Each of the bodies 11 to 16, inclusive, is symmetrical about its longitudinal axis, and each of the bodies is symmetrical on either side to a central plane therethrough intersecting the longitudinal axis at right angles. In the particular embodiment illustrated herein, each of the bodies has four exterior faces 1, 2, 3 and 4 symmetrically arranged about the longitudinal axis of the body and with the adjacent faces disposed at an angle of 90° to each other. Two similar sets of ports are provided, one disposed on either side of the plane of symmetry. Each set comprises four similar ports extending between one of said exterior faces and a longitudinally extending bore, the axis of which is coincident with the axis of symmetry. The ports of one set are numbered A1, A2, A3 and A4 and the ports of the other set are numbered B1, B2, B3 and B4. The A and B ports of any of the faces of any of the valve bodies are adapted to register with the A and B ports of any of the faces of any of the other bodies.

The pressure side of the pump 17 is connected to the port A1 of the valve body 11 by a conduit 18. An upwardly opening pressure relief valve 19 is slidably received within the longitudinal bore of the body 11 and cooperates with a seat 20 on a fixed spool sleeve 21 fixed in the lower end thereof in a manner well known in the valve art. The valve 19 is spring loaded downwardly against its seat 20 by a spring 38, and the tension on spring 38 is variable under the control of a thumb screw 39. A return conduit 22 connects the port B1 of the body 11 with the sump 23.

The port A3 of the body 11 is connected directly to the port A1 of the valve body 12 which contains a pressure-distributing valve, indicated at 24, in its longitudinal passage. The port B3 of the valve body 11 is connected directly to the port B1 of the body 12. The direct connection between said bodies is effected through short tubular members such as shown at 25, each of which is provided with a pair of O-ring seals 26. One of said O-ring seals is received within a counterbored portion 27 at the exterior end of the A or B ports of each of the valve bodies.

The valve 24 is of well known construction and is of the type which in one position permits the pressure entering one A port to pass directly out of any of the other A ports while permitting the return fluid entering one B port to flow directly out of any of the other B ports; in another position, routes the pressure entering one A port out of one B port and routes the return fluid entering through another of the A ports to another of the B ports; and in an intermediate position, completely blocks any flow therethrough. In its intermediate position illustrated in Fig. 4, all flow through the ports A1 and B1 of body 12 is blocked. A manual control handle 28 is provided to move the valve 24 to any of its three positions.

The port B2 of the selector valve body 12 is connected to the port B4 of the valve body 13. The valve body 13 is fitted with a valve seat sleeve 29 having an annular seat 30 at its upper end. The seat 30 is located between the A and B ports. An upwardly opening check valve 31a is slidably mounted in the longitudinal bore of the body 13 above the seat 30. The check valve 31a permits fluid to flow from any of the B ports to any of the A ports of the body 13 but prevents fluid flowing from the A ports to the B ports.

The A1 and B1 ports of the body 13 are connected by additional tubular members 25 to the A3 and B3 ports, respectively, of the body 14. A downwardly opening spring-loaded counterbalance valve 31 is slidably mounted in the longitudinal bore of the body 14 and is normally urged upwardly by a spring 32, the tension of which is adjustable by rotating a thumb screw 33. In the uppermost position of the valve 31, the head 34 of the lower end thereof blocks the B ports of the body and prevents entry therethrough. If pressure is introduced through one of the A ports, the valve 31 will move downwardly against the pressure of the spring 32 to permit fluid to leave by way of the B ports. The port A1 of the counterbalance valve body 14 is connected through a matching port 35 in an outer plate 36 to a conduit 37. The other end of the conduit 37 is connected to the rod, or piston, end of the hydraulic cylinder 10. A tubular member 25′ one-half the length of the tubular connectors 25, previously described, and having a single O-ring 26 thereon, is inserted in the counterbore 27 of the port A1 of the counterbalance valve body 14 to seal between the body and the plate 36.

Returning now to the selector valve body 12, the port A4 thereof is connected to the port A2 of the valve body 15 by another of the tubular connectors 25. The valve body 15 is supplied with an upwardly opening check valve 40 cooperating with a valve seat 41 on the upper end of a fixed sleeve 42 in the same manner as the check valve 31a previously described with respect to the valve body 13.

The A1 and B1 ports of the check valve body 15 are connected to the A3 and B3 ports, respectively, of the valve body 16 by another pair of the tubular connectors 25. The longitudinal passage in the valve housing 16 is provided with a flow control valve comprising a sleeve 43 having a plurality of small ports 44 therein adapted to be brought more or less into register with the A ports by rotation of the sleeve 43 relative to the body 16 by means of a thumb wheel 46 connected thereto, and a plurality of larger ports 45 adapted to be in register with the B ports regardless of the orientation of the ports 44 relative to the A ports. A slide spool 47 is slidably received within the sleeve 43 and is adapted to move downwardly to close the ports 44 whenever fluid is entering one of the B ports, all in a manner well known in the art of flow control valves. The port B4 of the flow control valve body 16 is connected to a conduit 48 through a suitable aperture 49 in an end plate 80, and another of the tubular members 25' is inserted therebetween. The other end of the conduit 48 is connected to the head end of the cylinder 10.

The A4 and B4 ports of the body 14 and the A2 and B2 ports of the body 11; the A4 port of the body 13 and the A2 port of the body 12; the A4 and B4 ports of the body 11 and the A2 and B2 ports of the body 16; and the B4 port of the body 12 and the B2 port of the body 15 are each connected by a cylindrical plug member 50 having two O-rings 51 thereon received within the counterbore 27 around each of the ports. The cylindrical plugs 50 are exactly the same as the tubular connectors 25 previously described with the exception that there is no passageway therethrough. Similarly, all of the external ports A or B which are not connected to an external conduit are fitted with cylindrical plugs 50' and covered with end plates such as shown at 52. It will be noted that the plate 53 covering the front face of the relief valve body 11 is provided with apertures 54 and 55 in register with the A1 and B1 ports thereof to permit connection of the conduits 18 and 22, respectively, therewith.

Blank end caps 56 are fixed to either end of the two check valve bodies 13 and 15 and to one end of the relief valve body 11. The other end of the relief valve body 11 is closed by a cap 57 carrying the thumb screw adjuster 39. The cap 58 on one end of the counterbalance valve body 14 carries a stop to limit the upward movement of the valve 31 and the cap 59 on the other end thereof carries the thumb screw adjustment 33. The cap 60 on one end of the flow control body 16 is recessed at 61 to receive the one end of the sleeve 43 and the cap 62 on the other end thereof carries the thumb wheel adjuster 46 which intermeshes with the other end of the sleeve 43. The cap 63 on one end of the selector valve body 12 is recessed as at 64 to permit proper longitudinal movement of the selector valve 24, and the cap 65 on the other end thereof carries the manual control handle 28 which is connected to the valve 24.

The selector valve body 12 is of the same external configuration as the other valve bodies 11, 13, 14, 15 and 16 but the ports A and B thereof are inclined so that the inner ends of the ports A1, B1, A3 and B3 are below the inner ends of the ports A2, B2, A4 and B4, respectively. The selector valve 24 is tubular and is provided with two external bosses 66 and 67 which cooperate with the out of register inner ends of the various ports to provide proper routing of the fluid between said ports.

When the selector valve 24 is raised from the position illustrated in Fig. 4 corresponding to the applying pressure to the piston rod end of the cylinder 10, the routing of fluid is as follows: fluid from the pump 17 passes through conduit 18 into the port A1 of relief valve body 11. Any excess pressure in conduit 18 will cause the valve 19 to lift against the pressure of the spring 38 and the excess fluid to bleed downwardly through the sleeve 21 and outwardly through the ports 68 therein and through the port B1 and conduit 22 to the sump.

The regulated pressure flows directly from the port A1 of the relief valve body 11 through the port A3 thereof into the port A1 of the selector valve body 12. Since the lower ends of bosses 66 and 67 in their raised position are above the inner ends of the A1 and B1 ports and below the inner ends of the A2 and B2 ports of the selector valve body 12, the fluid entering the A1 port will pass through the annulus between selector valve 24 and the body 12, and between the bosses 66 and 67, and outwardly from the B2 port into the B4 port of the check valve body 13.

The fluid entering the B4 port of the check valve body 13 can flow through the annulus around the lower end of the sleeve 29 and out the B1 port into the B3 port of the body 14, but it cannot get through there since the B3 port of the body 14 is blocked by the head 34 on the counterbalance valve 31. Instead, the fluid entering the B4 port of the check valve body 13 enters the sleeve 29 through the ports 69 therein and forces the check valve 31a upwardly and flows outwardly through the A1 port into the A3 port of the counterbalance valve body 14 and directly therethrough around the annulus between the heads of the counterbalance valve 31 and out of the A1 port of the body 14, through the conduit 37 to the piston rod end of the cylinder 10.

The fluid returning from the head end of the cylinder 10 passes through the conduit 48 and enters the B4 port of the flow control valve body 16. The fluid then flows outwardly through the B3 port and enters the B1 port of the check valve body 15.

The fluid entering the B1 port of the body 15 unseats the check valve 40, flows upwardly through the body 15 and out of the A2 port into the A4 port of the selector valve body 12. In the selector valve body the fluid enters above the boss 66, enters the hollow selector valve spool 24, flows downwardly therethrough to the area below the lower boss 67, outwardly through the B1 port into the B3 port of the regulator valve body 11, around the sleeve 21, and out of the B1 port into the return conduit 22.

When the handle 28 is moved upwardly to its intermediate position, the valve spool 24 of the selector valve moves downwardly until the bosses 66 and 67 thereon block the inner ends of the A1 and B1 ports, respectively, as shown in Fig. 4, and prevent any flow to or from the cylinder 10.

When the handle 28 is raised further, the bosses 66 and 67 move below the inner ends of the A1 and B1 ports and the pressure fluid entering the A1 port is now routed through the A4 port into the A2 port of the check valve body 15. Since the fluid cannot pass downwardly past the check valve 40, it leaves the A1 port of the body 15 and enters the A3 port of the flow control valve body 16. The fluid is metered through the variable opening ports 44 and passes downwardly through the sleeve 43, outwardly through the ports 45 and the B4 port of body 16 into conduit 48, and through the conduit 48 to the head end of the cylinder 48.

The fluid returning from the rod end of the cylinder 10 returns through the conduit 37 to the A1 port of the counterbalance valve body 14. Since the fluid cannot pass downwardly through check valve 31a of valve body 13, it cannot leave the body 14 by the A3 port therein, but must pass downwardly therethrough forcing the counterbalance valve 31 downwardly against the pressure of the spring 32 until the head 34 clears the B ports. The fluid then passes through the B3 port of the body 14 into the B1 port of the body 13, around the sleeve 29, out of the B4 port thereof into the B2 port of the selector valve body 12, through the annulus between the bosses 66 and 67 and out the B1 port into the B3 port of the body 11, around the sleeve 21 therein and out of the B1 port thereof into the return conduit 22.

As best seen in Fig. 2, a plurality of bolt receiving bores 75 extend through each of the bodies between the faces 1 and 3 thereof perpendicular to said faces. Similarly, a plurality of bolt receiving bores 76 extend laterally through each of the bodies between the faces 2 and 4 thereof. Each of the end plates 36, 53 and the end plates 52, adapted to lie adjacent the faces 1 or 3 of the bodies, is provided with a plurality of bores 77 adapted to register with the bores 75. Similarly, the end plate 50 and each of the end plates 52, adapted to lie adjacent the faces 2 or 4 of the bodies, is provided with a plurality of bores 78 adapted to register with the bores 76 through the bodies. When the bodies are assembled with their adjacent faces in contiguous relation, bolts 79 are inserted through the bores 77 and 75, and through the bores 78 and 76 to maintain the bodies in their assembled relation.

From the foregoing description it may be seen that I have provided a simple efficient valve fitting or body wherein the various valving functions necessary in a typical hydraulic system can all be performed in a single valve assembly made up of multiples of the basic body without requiring any external piping. From the illustrated example which shows six valves incorporating five different valving functions, it is obvious that the use of these bodies is very flexible and that as many or few as desired may be combined in many different ways to interconnect all of the valving functions necessary in a hydraulic system with a minimum of external piping.

While I have shown and described a preferred illustration of one simple system embodying the principles of my invention, it should be understood that various changes may be made in its construction by those skilled in the art, without departing from the spirit of the invention as defined in the appended claims.

Having thus described my invention, what I claim and desire to secure by Letters Patent is:

1. A multiple valve assembly comprising: a first valve body having four equal faces disposed to form a 90° angle with one another about a central axis, a valve receiving chamber formed in said body along said axis, a first set of similar ports formed in said body, one each of said ports extending inwardly from one each of said faces between the side edges in line with the central axis thereof to intersect said chamber, each of said ports having its axis in a common plane perpendicular to said central axis, a second set of similar ports formed in said body, one each of said second set of ports extending inwardly from one each of said faces between the side edges in line with the central axis thereof to intersect said chamber, each of said second set of ports having its axis in a common plane parallel to and spaced from said common plane of said first set of ports; second and third valve bodies identical to said first valve body and in which the spacing between the first and second ports on each side of each of the three valve bodies is the same; said valves being assembled with the axes of the valve bodies being parallel; said valves being further assembled with one face of said first valve body being flush against one face of said second valve body and with the first and second ports of said faces being in registration; said valves being further assembled with one face of said third valve body being flush against a second face of said second valve body and with the first and second ports of these latter faces being in registration; valve means in each of said valve receiving chambers to control flow between selected ports of the first set of ports and selected ports of the second set of ports within each of said valve bodies; and means to hold said assembled valve bodies rigidly in the above assembled relationship.

2. A valve comprising a valve body having four equal faces disposed to form a 90° angle with one another about a central axis, a valve receiving chamber formed in said valve body along said axis thereof, a first set of similar ports extending from the faces of the valve body inwardly to intersect said chamber, one each of said first set of ports being formed on each one of said faces between the edges in line with the central axis thereof, and the axes of each of said first set of ports lying in a common plane perpendicular to said central axis, a second set of ports extending from the faces of the valve body inwardly to intersect said chamber, one each of said second set of ports being formed on each one of said faces between the edges in line with the central axis thereof, and the axes of each of said second set of ports lying on a common plane parallel to and spaced from the common plane of said first set of ports, whereby each of the faces of said valve body has two ports therein with the axes of said ports intersecting the centerline of the face and being spaced from one another, and valve means in said valve receiving chamber for controlling flow from selected ports of one of said sets of ports to selected ports of the other of said sets of ports.

References Cited in the file of this patent

UNITED STATES PATENTS

| 2,575,240 | Thompson | Nov. 13, 1951 |
| 2,586,932 | Gardiner et al. | Feb. 26, 1952 |